(No Model.) 2 Sheets—Sheet 1.
J. L. SHUTE & A. ANDRÉN.
FOOD FIBERING OR SHREDDING MACHINE.
No. 535,263. Patented Mar. 5, 1895.
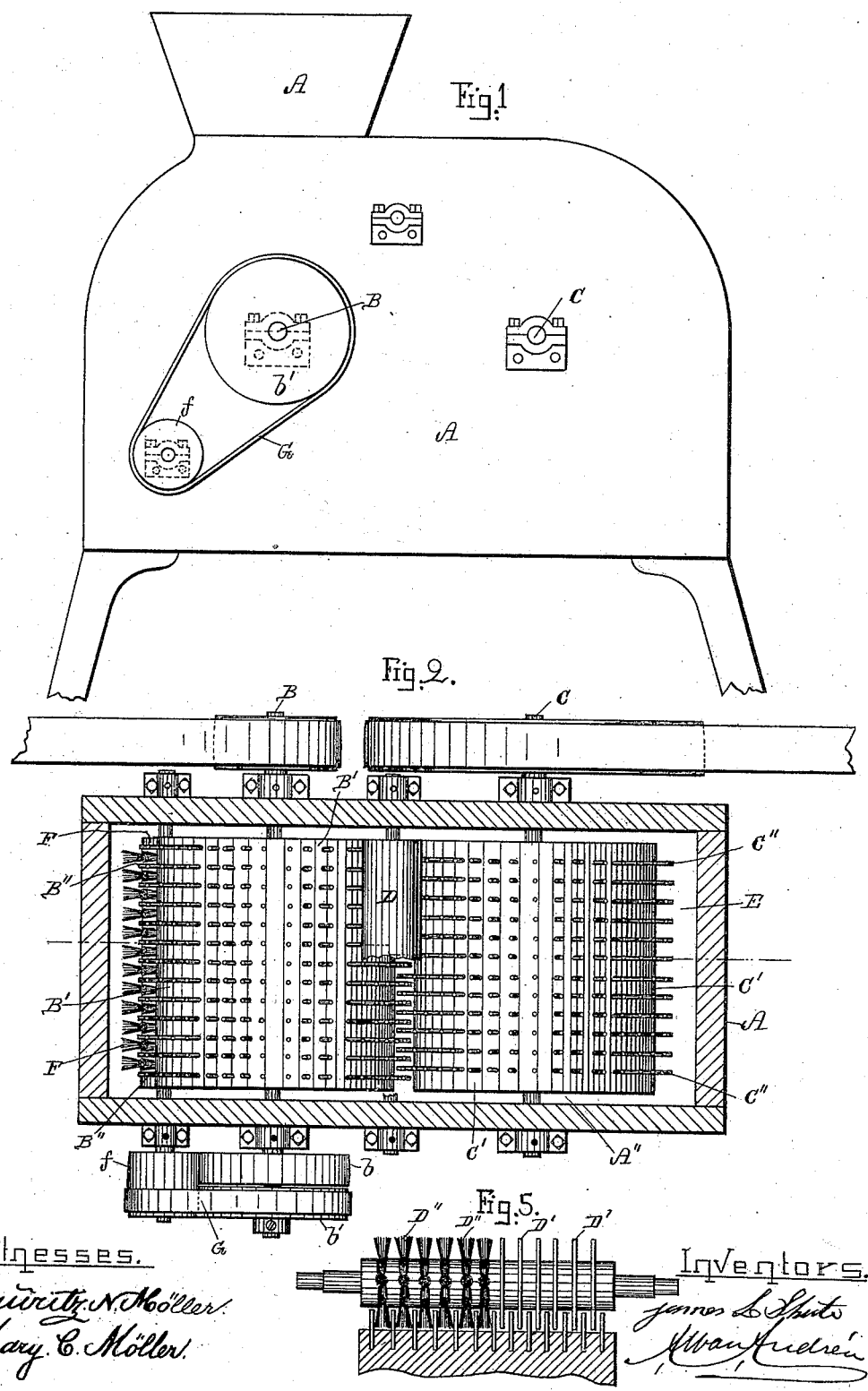
Witnesses.
Lauritz N. Möller
Mary C. Möller
Inventors.
James L. Shute
Alban Andrén

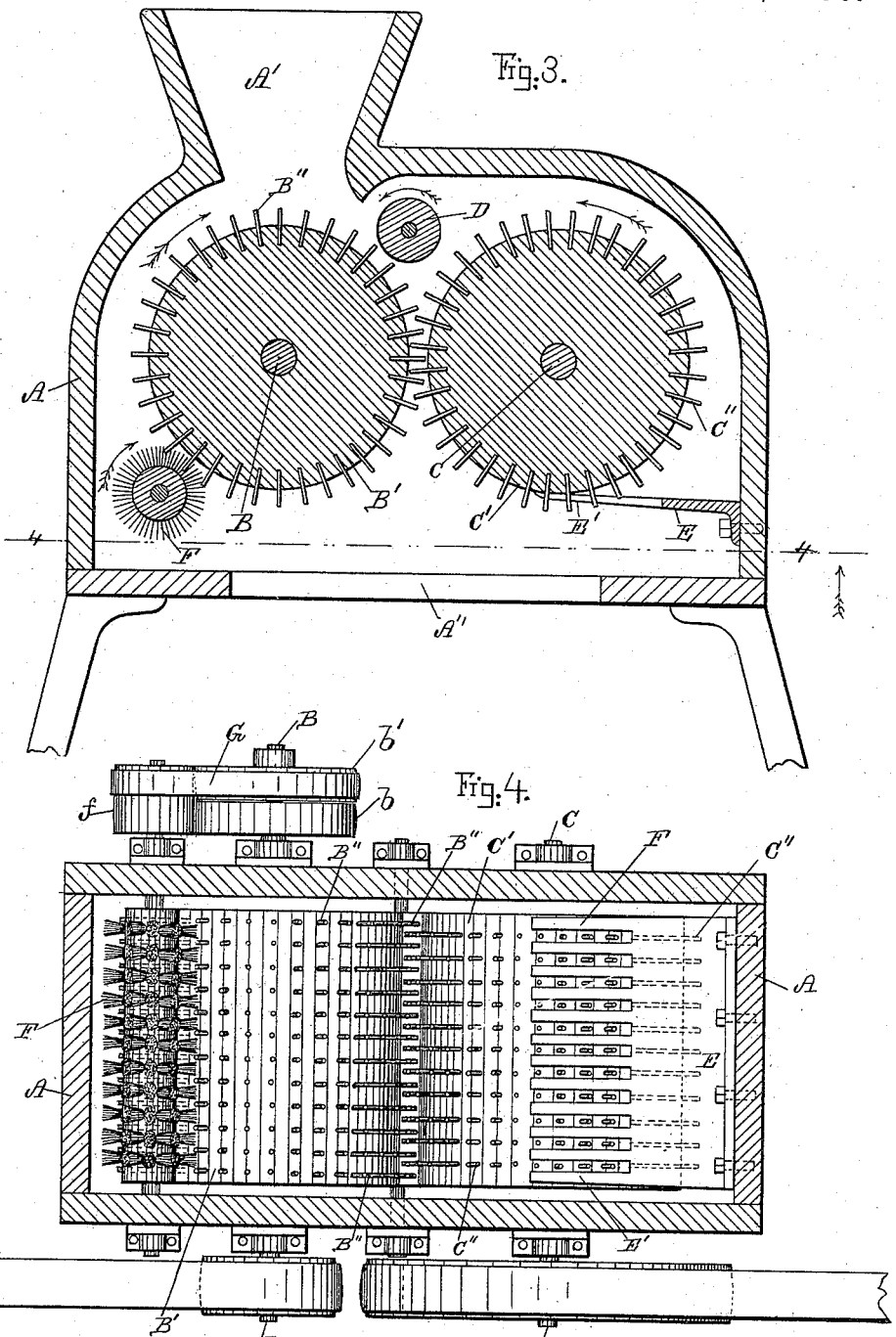

United States Patent Office.

JAMES L. SHUTE, OF GLOUCESTER, AND ALBAN ANDRÉN, OF BEVERLY, MASSACHUSETTS; SAID ANDRÉN ASSIGNOR TO WILLIAM T. MERCHANT, OF GLOUCESTER, MASSACHUSETTS.

FOOD FIBERING OR SHREDDING MACHINE.

SPECIFICATION forming part of Letters Patent No. 535,263, dated March 5, 1895.

Application filed October 29, 1894. Serial No. 527,396. (No model.)

*To all whom it may concern:*

Be it known that we, JAMES L. SHUTE, a resident of Gloucester, and ALBAN ANDRÉN, a resident of Beverly, in the county of Essex, State of Massachusetts, citizens of the United States, have invented new and useful Improvements in Food Fibering or Shredding Machines, of which the following, taken in connection with the accompanying drawings, is a specification.

This invention relates to improvements in machines for the purpose of fibering or shredding animal or vegetable food, and is particularly well adapted for fibering or shredding fish, as will hereinafter be more fully shown and described, reference being had to the accompanying drawings, wherein—

Figure 1 represents a side elevation of the improved machine. Fig. 2 represents a top plan view showing the upper portion of the inclosing case removed. Fig. 3 represents a central longitudinal section of the machine. Fig. 4 represents a sectional view on the line 4—4 shown in Fig. 3; and Fig. 5 represents a detail top plan view of the feed roller.

Similar letters refer to similar parts wherever they occur on the different parts of the drawings.

In the drawings A represents a suitable inclosing case frame, or box in bearings in which are journaled the roller shafts B and C, to which are secured respectively the cylindrical rollers B', C', provided on their circumferences with the cylindrical radial pegs or projections B'', C'', which are arranged in concentric annular rows, in such a manner that the rows of pegs or projections on one cylinder is caused to intermesh between the corresponding rows of pegs or projections on the other cylinder, as shown.

A' is a hopper or feed opening through which the food to be fibered is introduced to the action of the rotary cylinders B' and C' as shown.

The cylinders B' and C' are set in rotary motions in the direction of the arrows shown in Fig. 3, and in practice it is preferable to rotate one of the rollers quicker than the other one so as to cause the food introduced between the toothed rollers not alone to be punctured or penetrated by the projections or pegs thereon, but also to be shredded or fibered by the pulling motion of one roller relative to the other by which the food is properly fibered or shredded in a disintegrated flaky mass, suitable for the preparation of palatable dishes.

D is a rotary feed or conductor roll, the axle of which is journaled in bearings in the sides of the case A, and said roll is arranged close up to the fibering roll B', without touching the latter. Said feed and conductor roll D may be smooth and of a cylindrical form as shown in Figs. 2 and 3, or it may be made with annular projecting flanges D', D', or bristles D'', D'', adapted to project into the spaces between the pegs or projections on the cylinder B', as shown in Fig. 5.

The feed and conductor roll D is loosely rotated by the food as it is being conveyed by the toothed cylinder B'.

The roller D serves the purpose of forcing the food to be fibered or shredded in between the pegs or projections on the cylinder B', and, thus causes it to be properly fibered or shredded, as it is being conducted between the cylinders B', C', and their peripheral pegs or projections.

The fibered or shredded food as it leaves the cylinders B', C', drops through an opening A'', in the bottom of the case A, into a box or suitable receptacle placed on the floor of the room in which the machine is located.

In machines of this kind it is very desirable and necessary that means should be provided for automatically cleaning the surfaces of the cylinders B', C', and their peripheral pegs or projections from food accumulations, as well as from crystallization caused by the pickle by which fish or other food is treated previous to being fibered or shredded, and for this purpose a suitable cleaning device is employed as shown in Figs. 3 and 4.

In connection with the cylinder C', is shown a stationary comb plate E, the prongs E' of which are adapted to lie in contact with the curved surface of the cylinder C', between the rows of pegs or projections C'' thereon, as fully shown in Figs. 3 and 4. It will thus be seen that the food accumulations on said cylinder C' are automatically removed and allowed to drop through the box perforation A'', during the rotation of said cylinder C', thus keeping it at all times clean and in proper working condition.

Arranged in suitable bearings in the casing A is a rotary brush F, the bristles of which lie in contact with the cylinder B', and mesh between the pegs or projections thereon. Such cleaning brush is to be set in a rotary motion in an opposite direction to that of the cylinder B', and this may be done by means of any suitable mechanism. In the drawings is shown for this purpose fast and loose pulleys $b$, $b'$, on the shaft B, from which leads a belt G to a pulley $f$ on the axle of the brush F.

The belt G may be shipped on to the loose pulley $b'$ whenever it is desired to keep the brush F stationary.

Any suitable belt shipper device may be used for the purpose of shipping the belt G to and from the fast and loose pulleys, $b$, $b'$.

Having thus fully described the nature, construction, and operation of the invention, we wish to secure by Letters Patent and claim—

In a food fibering or shredding machine, the combination of the casing A, the shafts B, C, journaled therein, the rolls B', C', rigidly mounted on said shafts, means for rotating the latter in opposite directions and at different speeds, intermeshing radial pins arranged in parallel rows on the peripheries of said rolls, a hopper arranged over the roll B, a loosely rotating feed roller D arranged in close proximity to said roll and to one side of the hopper, a stationary comb plate E arranged beneath and in contact with the roll C', a rotary brush F arranged to rotate in contact with the roll B, and a belt connecting said roll and brush, substantially as shown and described and for the purpose specified.

In testimony whereof we have signed our names to this specification, in the presence of two subscribing witnesses, on this 20th day of October, A. D. 1894.

JAMES L. SHUTE.
ALBAN ANDRÉN.

Witnesses:
FRANCIS A. PERRY,
C. E. NICHOLSON.